July 14, 1942.   E. H. LAND   2,289,713
LIGHT POLARIZER AND PROCESS OF MANUFACTURE
Filed Oct. 5, 1938
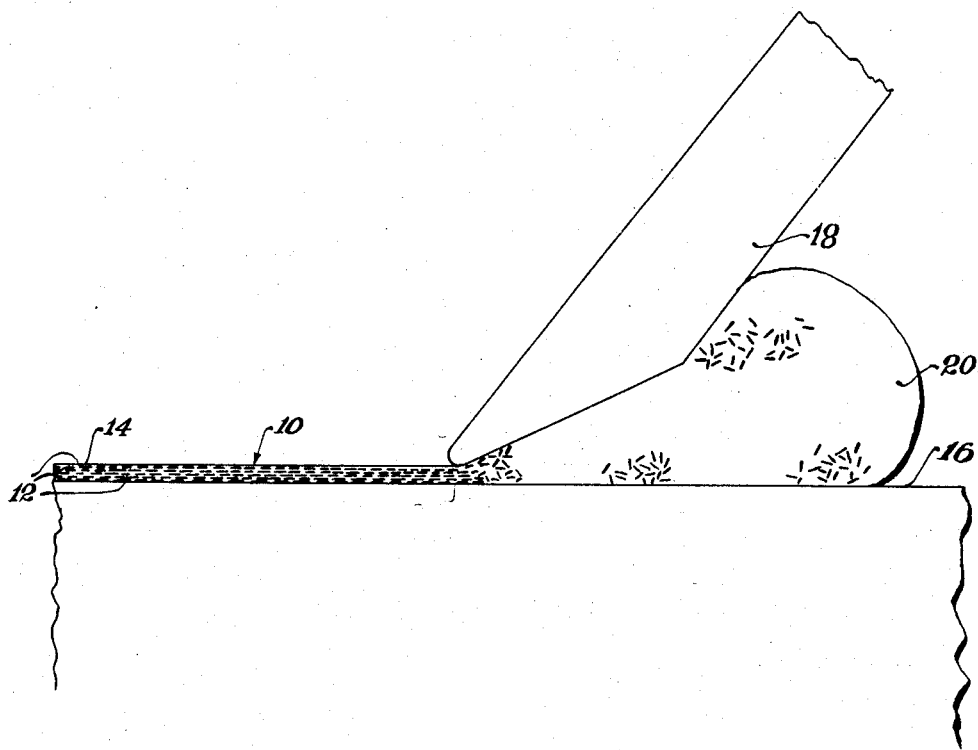
INVENTOR.
Edwin H. Land
BY Brown & Jones
ATTORNEY.

Patented July 14, 1942

2,289,713

UNITED STATES PATENT OFFICE 2,289,713

LIGHT POLARIZER AND PROCESS OF MANUFACTURE

Edwin H. Land, Boston, Mass., assignor to Polaroid Corporation, Dover, Del., a corporation of Delaware Application October 5, 1938, Serial No. 233,379

6 Claims. (Cl. 88—65)

This invention relates to a new and improved light-polarizer and to the process of manufacturing the same.

An object of the invention is to provide a light-polarizing body in the form of an exceedingly thin film or foil having a thickness, for example, less than .0005 of an inch.

A further object of the invention is to provide a polarizer of the character described comprising a highly concentrated suspension of oriented, needle-shaped polarizing particles in a light-transmitting medium.

A still further object of the invention is to provide such a polarizer in which the suspended polarizing particles constitute more than 25% by weight of the suspension.

Other objects of the invention are to provide such a polarizing body in which the suspended polarizing particles are longer in one direction than the wave lengths of light polarized by the body, and shorter in a direction at right angles thereto than said wave lengths; in which the elongated, or needle axes of said particles are oriented to substantial parallelism; in which the suspended particles are dichroic; in which the index of refraction of the suspending medium is approximately equal to, or less than, the index of refraction of the suspended particles for the component of the incident light which is transmitted by said body; in which the suspending medium comprises a substantially saturated solution in a plastic of the material comprising the suspended particles, and in which the suspending medium is substantially colorless and absorbs a minimum of the incident light.

A still further object of the invention is to provide a process for the manufacture of light-polarizing bodies of the character described.

The invention accordingly comprises the several steps and the relation of one or more of such steps with respect to each of the others, and the product possessing the features, properties, and the relation of elements which are exemplified in the following detailed disclosure, and the scope of the application of which will be indicated in the claims.

For a fuller understanding of the nature and objects of the invention reference should be had to the following detailed description taken in connection with the accompanying drawing, which represents diagrammatically and greatly enlarged a view of the product of the present invention and a method of manufacturing the same.

There has heretofore been produced commercially light-polarizing material comprising a suspension of oriented, needle-shaped particles of herapathite or a herapathite-like compound in a light-transmitting suspending medium such as a light-transmitting plastic. This material has been sold under the trade name "Polaroid" and has been available in sheets of any desired area.

The commercial "Polaroid" polarizing sheeting of the crystal suspension type has comprised rather dilute dispersions of polarizing crystals in suspending media and is described in Patent No. 1,918,848, which issued July 18, 1933, to Land et al.; No. 1,956,867, which issued May 1, 1934, to Land; No. 1,989,371, which issued January 29, 1935, to Land; No. 2,011,553, which issued August 13, 1935, to Land; No. 2,041,138, which issued May 19, 1936, to Land; No. 2,078,254, which issued April 27, 1937, to Land, and others. In so far as these patents teach the degree of concentration of the polarizing crystals in a suspending medium, it would appear that the concentration might range from approximately 15% or 20% by weight of the crystal material to a very much lower concentration, for example from 2% to 5% by weight of the crystalline material.

In commercial practice sheets of the above type have been made uniformly in thicknesses in excess of .001 of an inch, and at times approaching .015 of an inch. The thinner commercial sheets, i. e., those approximately .002 of an inch thick, do not completely polarize the transmitted beam. The usual thickness for commercial use has been approximately from .003 to .005 of an inch, and at this thickness the sheet is self-supporting, has good tensile strength, may be rolled, shipped and handled in laminating processes, and shows a high efficiency in the polarization of transmitted light. A sheet, for example, shows a percentage polarization of approximately 99.99%.

Polarizers of the above type, and more particularly polarizers comprising oriented suspensions of polarizing particles in transparent media, absorb a small percentage of the component of the incident light which it is desired to transmit. This absorption takes place to a large degree in the suspending medium, which may be slightly discolored due to solution therein of some of the material forming the polarizing particles. In fact, in many of the forms of polarizers hereinafter described, the suspending medium may comprise a substantially saturated solution of the material of the polarizing particles in the suspending medium. Under these circumstances it is desirable to reduce to a minimum the thickness of the polarizing suspension so that the absorption of the component which it is desired to transmit may be reduced to a minimum.

Furthermore, an exceedingly thin, foil-like polarizer may be more readily distorted from its original form than the thicker, more rigid forms heretofore made. Polarizing films having a thickness, for example, of one quarter to one half thousandth of an inch may be applied readily to non-planar, convex or concave surfaces.

This invention contemplates the provision of a new type of polarizer having physical properties such that it may be readily applied to a surface of any shape or form and having optical properties comparable with or better than those of the commercial type now on the market.

Furthermore, this invention contemplates a simple method for the manufacture of polarizing bodies of the character described.

In the practice of the present invention suspensions of unoriented, herapathite-like particles of needle shape in a suitable light-transmitting suspending medium are prepared by following generally the processes outlined in the patents already referred to as disclosing methods of manufacturing polarizing sheeting with this difference: The concentration of the needle-shaped polarizing particles in the suspending medium is very greatly increased. It should exceed, for example, a concentration such that the suspension is by weight at least 25% polarizing crystals, and the crystalline concentration may be such in the practice of the present invention that the weight of the crystal mass substantially exceeds the weight of the suspending material, and may approximate one and one-half times the weight of the suspending light-transmitting plastic.

The suspended crystalline particles may preferably be of the herapathite type, such as polarizing compounds comprising quinine or cinchonidine.

The particles are preferably minute in size, having, preferably, one dimension shorter than the wave lengths of the light used with the suspension. The particles are preferably needle-shaped or in any event elongated and of a length, in the direction of the elongated or needle axes, exceeding the wave lengths of light used with the suspension. If the particles are of the type already specified and are oriented with their needle axes parallel in the suspending medium, the suspension will substantially absorb that component of the incident light vibrating in the direction of orientation of the needle axes and will transmit the component vibrating at right angles thereto.

The suspending medium may comprise any of the suitable media mentioned in the patents heretofore referred to, and more specifically cellulosic media, such as cellulose acetate or cellulose nitrate, or a vinyl compound, such for example as a vinyl acetate or a vinyl acetal resin, or mixed cellulose esters, or methyl methacrylate, or the like.

In a preferred form of the invention the suspending medium may have an index of refraction coinciding substantially with the index of refraction of the suspended polarizing particles for the transmitted component of the incident beam, i. e., for the component vibrating perpendicular to the oriented needle axes of the particles. Under such conditions no trace of scattering of the transmitted light is apparent. This is highly desirable where the material is to be used in viewing screens or visors, especially where the material is to be used as a screen or visor in connection with systems employing polarized light in the reduction of headlight glare. Dark objects on or near a road are best seen in the light of automobile headlights when there is absolutely no scattering of transmitted light in the visor or viewing screen through which the objects are viewed.

The desired index of the suspending medium may be easily obtained by mixing different plastics and plasticizers in ways known to the art.

If desired, the index of refraction of the suspending medium may be lower than that of the suspended particles for the desired component, and specifically the index of the medium, when herapathite-like particles are employed, may be as low as 1.47 without appreciable scattering developing, but the index of the medium should preferably not exceed the index of the particles for the desired component.

Where the concentration of polarizing crystals in the suspending medium is within the range outlined above, i. e., in excess of 25% of the weight of the suspension and preferably in the neighborhood of the weight of the plastic material forming the suspending medium, a very high degree of polarization, for example, the same polarization as may be secured by a crystal of comparable thickness of herapathite, may be obtained from exceedingly thin suspensions of the oriented crystals within the suspending medium. Suspensions considerably less than .001 of an inch in thickness have been found to give substantially complete polarization to a transmitted beam. A preferred thickness for the high concentration type of polarizer in film or foil form is approximately .0003 of an inch or less. Such a suspension adheres firmly to a support on which it is formed. Although thin and tenuous, the unsupported film retains its polarizing properties, and has been shown to be a highly efficient polarizing body.

The product of the present invention is intended for use primarily in connection with a support, and more especially it is intended for use as a coating for a light-transmitting or light-reflecting supporting surface which it is desired to convert into a polarizing body. To this end the polarizer of the present invention is preferably formed upon the surface upon which it is to be used, or upon a suitable support from which it may be transferred, either by a single direct transfer or by means of successive transfers to the surface upon which it is intended ultimately to be used.

It is therefore desirable that the orientation of the needle-like crystals within the suspending medium be effected and the desired thickness of the suspension be attained upon a suitable supporting surface. Speaking generally, any surface which does not react with the suspending medium or the polarizing particles in suspension and which is smooth and of sufficient hardness may be employed in the formation of the polarizer. More specifically the polarizer may be formed upon a surface of glass or of a plastic such as cellulose acetate or an acrylic acid ester or the like, or it may be formed upon a chromium plated metallic surface, or a surface of wood, paper or the like.

In the formation of the polarizer a mass of a suspension of the polarizing crystals in the suspending medium is deposited upon the support upon which the polarizer is to be formed. The needles are heterogeneously distributed throughout the suspending medium, and the mass preferably contains sufficient solvent for the suspending medium so as to have a smearable consistency, and preferably a consistency such that it may be repeatedly smeared across the surface of the support without hardening or drying too rapidly and may yet retain the crystals in oriented condition within the suspending medium as the smear effects orientation. A suitable plasticizer may, if desired, be added to the suspending medium.

After a desired quantity of the suspension has been deposited on the support, the suspension is forced into close contact with the support and smeared across the supporting surface by forcing a smearing element, such as a knife edge or other instrument, against the suspension and effecting movement between the instrument and the face of the support, in the manner shown, for example, in the drawing. Any suitable material may be employed as the smearing tool. Glass, rubber, fibre, steel blades, have all been satisfactorily used. The smearing blade should preferably be so employed as to exert considerable pressure against the suspension, so as to force the suspension at relatively high pressure against the supporting surface. For example, pressures in excess of 50 or 60 pounds per square inch have been found satisfactory. Where a sharp edged blade is employed as the smearing blade, it will be apparent that high pressures of this type and even higher may be easily secured without the application of great force or pressure to the blade.

Preferably a plurality, for example four or more smearing strokes, should be used; the smeared coating of the suspension should be repeatedly traversed by the smearing blade or by a plurality of successive blades, and the strokes should be preferably of uniform character. The film formed by the first smear should preferably be subjected to further smearing operations before it has a chance to dry out thoroughly, and the entire operation should be completed before the deposited film has hardened to an extent that successive smearing strokes tend to tear or destroy the film.

The product of the present invention is shown in the drawing as comprising an exceedingly thin suspension 10 of a multiplicity of small, needle-shaped polarizing particles 12 in a light-transmitting plastic medium 14. The concentration of the particles within the medium is high, and the product of the present invention is preferably formed upon a suitable support 16.

In the drawing, 18 may be taken as representing the smearing blade, and 20 the mass of disoriented particles in the suspending medium acted upon by the blade during the smearing process.

It is to be understood that while the product of the present invention is preferably formed in the manner outlined, as by smearing upon a suitable support, it may be formed in other ways, for example in accordance with the teachings of the patents already referred to. It is to be understood that the product claims herein are intended to cover the product of the invention irrespective of the process used in manufacture.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described my invention, what I claim as new and desire to secure by Letters Patent is:

1. A light-polarizer comprising, in combination, a transparent support having a coating on one surface thereof of a suspension of minute, needle-shaped light-polarizing particles in a light-transmitting plastic, the suspension conforming in shape to the surface of the support and having a thickness between .0001 and .001 of an inch, the concentration of the polarizing particles within the suspension being such that the particles comprise in excess of 25% of the suspension by weight, said coating being applied by successive stroking of said suspension on said support with relatively high pressure, said stroking being in a uniform, linear direction and serving to orient said particles to substantial parallelism.

2. A light-polarizing film having a thickness between .0001 and .001 of an inch and comprising a suspension of needle-shaped polarizing particles in a light-transmitting medium, the particles being packed in close proximity to each other and being oriented with their needle axes substantially parallel and comprising by weight more than 25% of the weight of the suspension, the particles being longer than the wave lengths of visible light in the direction of their needle axes and shorter than the wave lengths of visible light in a direction at right angles to their needle axes, and the suspending medium having an index of refraction not exceeding the index of refraction of the suspended particles for the transmitted component of light incident on the film.

3. A light-polarizer comprising a suspension of minute, needle-shaped oriented, light-polarizing crystals, of the class consisting of the polarizing compounds of quinine and cinchonidine, in a light-transmitting medium comprising a material from the class consisting of the transparent synthetic plastics, the polarizing body having a thickness not exceeding .0005 of an inch, the concentration of the crystals within the plastic being such that said crystals are packed closely together and comprise in excess of 25% of the weight of the polarizing body, said crystals being longer, in the direction in which they absorb incident light, than the wave lengths of light in the visible spectrum, and being shorter than said wave lengths in a direction at right angles to said first-mentioned direction.

4. The process of forming a polarizing film which comprises applying to a relatively smooth supporting surface a suspension of minute, needle-shaped polarizing particles in a light-transmitting plastic, said suspension being of a viscosity such as to retain said particles in any condition of orientation in which they may be placed upon smearing of said suspension, and repeatedly forcing a movable smearing element against said suspension in a direction substantially perpendicular to the surface of said support and repeatedly moving said element with respect to said support in a direction to smear and spread said suspension over said support, the relative motion between said smearing element and said support on each of said smearing movements being substantially in the same direction, said smearing movements being continued until a polarizing film is formed.

5. The process of forming a polarizing film which comprises applying to a relatively smooth supporting surface a suspension of minute, needle-shaped polarizing particles in a light-transmitting plastic, said particles comprising by weight more than 25% of the weight of said suspension, said suspension being of a viscosity such as to retain said particles in any condition of orientation in which they may be placed upon smearing of said suspension, and repeatedly forcing a movable smearing element against said suspension in a direction substantially perpendicular to the surface of said support and repeatedly moving said element with respect to said support in a direction to smear and spread said suspension over said support, the relative motion between said smearing element and said support on each of said smearing movements being substantially in the same direction, said smearing movements being continued until a polarizing film is formed of a thickness not exceeding .001 of an inch.

6. The process of forming a polarizing film which comprises applying to a relatively smooth supporting surface a suspension of minute needle-shaped polarizing particles in a solution of a light-polarizing suspending medium in a volatile solvent, said suspension being of a viscosity such as to retain said particles in any condition of orientation in which they may be placed upon smearing of said suspension, and repeatedly forcing a movable smearing element against said suspension in a direction substantially perpendicular to the surface of said support and repeatedly moving said element with respect to said support in a direction to smear and spread said suspension over said support, the relative motion between said smearing element and said support on each of said smearing movements being substantially in the same direction, said smearing movements being continued until a polarizing film is formed, said smearing movements being performed while said volatile solvent is evaporating.

EDWIN H. LAND.